United States Patent
Wallace et al.

(10) Patent No.: US 8,994,523 B2
(45) Date of Patent: *Mar. 31, 2015

(54) BRAKE MONITORING SYSTEM AND METHOD

(71) Applicant: MGM Brakes, Charlotte, NC (US)

(72) Inventors: Thomas Edward Wallace, Charlotte, NC (US); Richard J. Rink, Charlotte, NC (US); Mark David Chandler, Bloomfield, NY (US)

(73) Assignee: Indian Head Industries, Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/666,291

(22) Filed: Nov. 1, 2012

(65) Prior Publication Data

US 2013/0072351 A1    Mar. 21, 2013

Related U.S. Application Data

(63) Continuation of application No. 12/691,659, filed on Jan. 21, 2010, now Pat. No. 8,319,623.

(60) Provisional application No. 61/147,029, filed on Jan. 23, 2009.

(51) Int. Cl.
*B60Q 1/00* (2006.01)
*B60W 30/18* (2012.01)
(Continued)

(52) U.S. Cl.
CPC ......... *B60W 30/18109* (2013.01); *Y10T 477/81* (2015.01); *B60Q 11/00* (2013.01); *B60T 17/22* (2013.01); *B60W 10/04* (2013.01); *B60W 10/184* (2013.01); *B60W 10/188* (2013.01)
USPC .......................................... 340/453; 340/454

(58) Field of Classification Search
USPC ........ 340/454, 453; 303/122.03, 122.11, 123; 701/29.1, 34.4; 188/1.11 R, 1.11 W
See application file for complete search history.

(56) References Cited

U.S. PATENT DOCUMENTS

| | | | |
|---|---|---|---|
| 4,172,364 A | 10/1979 | Young | |
| 4,596,319 A | 6/1986 | Cumming | |

(Continued)

FOREIGN PATENT DOCUMENTS

| | | | |
|---|---|---|---|
| CA | 2 064 334 | 9/1993 | |
| CA | 2064334 | * 9/1993 | ................ G01L 5/28 |

OTHER PUBLICATIONS

PCT/US2011/040895 International Search Report dated Oct. 25, 2011, 2 pages.

(Continued)

*Primary Examiner* — Firmin Backer
*Assistant Examiner* — Brian Wilson
(74) *Attorney, Agent, or Firm* — Warner Norcross & Judd LLP

(57) ABSTRACT

A brake monitoring system and method for a vehicle having multiple axles and a plurality of brake actuators and an engine control module, each brake actuator being associated with one of the axle. The system include sensors for measuring, in real-time, brake pressure and brake lining wear, and generating first and second signals. The first and second signals are received and stored in a chassis communications module. The chassis communications module detects fault condition of the brakes as a function of the first and/or second signals and for recording the fault condition, the fault condition being one of a brake monitor warning and a brake lining warning and provides an indication of status via warning lights.

19 Claims, 7 Drawing Sheets

(51) Int. Cl.
  *B60Q 11/00* (2006.01)
  *B60T 17/22* (2006.01)
  *B60W 10/04* (2006.01)
  *B60W 10/184* (2012.01)
  *B60W 10/188* (2012.01)

(56) References Cited

U.S. PATENT DOCUMENTS

| | | |
|---|---|---|
| 4,995,480 A | 2/1991 | Hazelden et al. |
| 5,433,296 A | 7/1995 | Webberley |
| 5,450,930 A | 9/1995 | Martens et al. |
| 5,791,441 A | 8/1998 | Matos et al. |
| 5,825,287 A | 10/1998 | Zarybnicky, Sr. et al. |
| 6,105,730 A | 8/2000 | Ekeroth |
| 6,276,494 B1 | 8/2001 | Ward et al. |
| 6,311,804 B1 | 11/2001 | Baalmann et al. |
| 6,341,670 B1 * | 1/2002 | Leblanc et al. .......... 188/1.11 L |
| 6,411,203 B1 | 6/2002 | Lesesky et al. |
| 6,411,206 B1 | 6/2002 | Weant et al. |
| 6,481,542 B2 | 11/2002 | Giering et al. |
| 6,608,554 B2 | 8/2003 | Weant et al. |
| 6,728,603 B2 * | 4/2004 | Pruzan et al. ..................... 701/1 |
| 6,744,352 B2 | 6/2004 | Lesesky et al. |
| 6,755,233 B2 | 6/2004 | Fisher |
| 6,891,468 B2 * | 5/2005 | Koenigsberg et al. ........ 340/453 |
| 7,014,016 B2 | 3/2006 | Morris et al. |
| 7,015,800 B2 | 3/2006 | Lesesky et al. |
| 7,175,006 B2 | 2/2007 | Plantan et al. |
| 7,373,224 B2 | 5/2008 | Goetz et al. |
| 7,449,993 B2 | 11/2008 | Lesesky et al. |
| 7,555,375 B2 | 6/2009 | Pettersson et al. |
| 7,624,849 B2 | 12/2009 | Goncalves et al. |
| 8,319,623 B2 | 11/2012 | Wallace et al. |
| 2007/0045060 A1 * | 3/2007 | Pettersson .................... 188/72.1 |
| 2007/0179798 A1 * | 8/2007 | Inbarajan .......................... 705/1 |
| 2007/0256901 A1 | 11/2007 | Niehorster et al. |
| 2013/0072351 A1 | 3/2013 | Wallace et al. |

OTHER PUBLICATIONS

International Search Report for International Application PCT/US2011/040895 mailed Nov. 3, 2011.

* cited by examiner

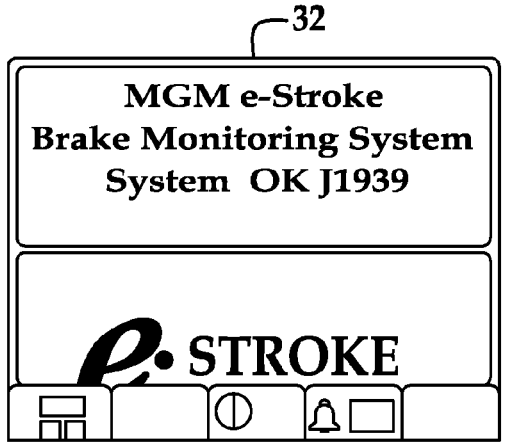
FIG. 9
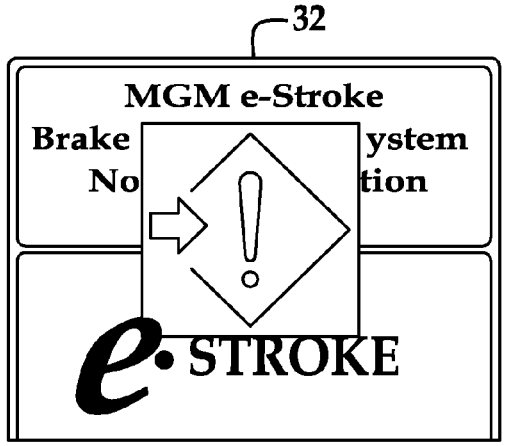
FIG. 10
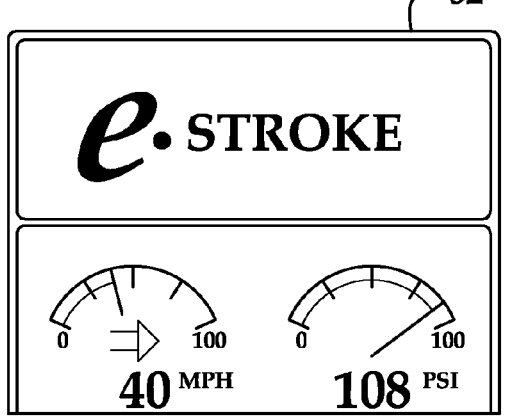
FIG. 11
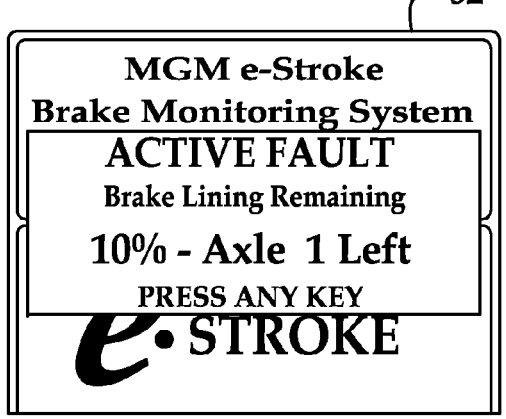
FIG. 12
FIG. 13

BRAKE MONITORING SYSTEM AND METHOD

RELATED APPLICATIONS

The present application is a U.S. Continuation Patent Application which claims priority to U.S. Non-Provisional patent application Ser. No. 12/691,659, filed Jan. 21, 2010 which claims priority to U.S. Provisional Patent Application Ser. No. 61/147,029, filed Jan. 23, 2009, which is hereby incorporated by reference.

FIELD OF THE INVENTION

The present invention relates generally to the brake monitoring system a motor vehicle, and more particularly, to a brake monitoring system which measures, records, and can transmit actual brake pressure in real time for the purpose of detecting fault conditions and performing diagnostics, on-board and/or off-board the motor vehicle.

BACKGROUND OF THE INVENTION

The present invention relates to an improved brake monitoring system, particularly for use on vehicles such as a tractor and trailer combination.

In the prior art, heavy duty trucks and other large vehicles are typically equipped with an air brake actuating system. The air brake actuating system applies air to a service chamber to move a diaphragm in a first direction. A push rod typically moves with the diaphragm, and the push rod is connected to a linkage that actuates the vehicle brakes. An emergency chamber is generally also attached adjacent to the service chamber, and is operable to move the push rod in the event that the air system fails. To this end, a high strength power spring is typically incorporated into the emergency chamber to actuate the push rod when there is a failure in the system air line. This spring also typically actuates the push rod when the vehicle is parked.

A brake actuator has a predetermined amount of available movement, or stroke, for the push rod. The amount of movement of the push rod required to fully actuate the brakes must be carefully monitored such that it is within the stroke of the brake actuator. The prior art has experienced situations wherein there has been an excessive amount of push rod movement for actuation of the brake system. This excessive required push rod movement can be created by any one of several factors. Typically, excessive movement is due to brake lining wear. As the brakes wear, more movement of the push rod is required to actuate the brakes. Further, as the linkages, connections, etc. between the members connecting the push rod to the brakes bend or become loose or excessively worn, additional push rod movement may be required to adequately stroke the brake. A combination of these several features may sometimes cause the amount of push rod movement required to actuate the brakes to approach the available push rod movement, or stroke, from the brake actuator. This is, of course, an undesirable situation.

The prior art has attempted to monitor the amount of push rod movement during actuation of the brake, and provide some indication to an operator of when there is excessive push rod movement. The determination of when there is excessive push rod movement is dependent upon the designed stroke, or rated stroke, of the brake actuator. In addition, an apparatus known as a slack adjuster is typically placed between the push rod and the foundation brake. The slack adjuster is incrementally adjusted to compensate for slack in the braking system and to decrease the required push rod movement. Automatic slack adjusters are now available which automatically adjust the foundation brake system.

Electronic indicator systems have been proposed. However, there are several obstacles to overcome. First, powering and monitoring electronic indicators on each of the brake actuators on an 18-wheel vehicle is costly. The cost in wiring alone for the vehicle exceeds the cost of all the electronic indicators and monitoring equipment combined. Further, the hostile environment in which the brake actuators are mounted can damage the wires connecting the brake actuators to a controller.

Further, there are numerous configurations for the tractors as well as the trailers. For example, the number of axles on tractors and trailers can vary. Each axle may include a spring brake actuator or just a service brake actuator. For efficiency, it would be desirable to have a single electronic controller which could be permanently programmed to recognize the specific configuration of the vehicle on which it is installed.

One such system is disclosed in U.S. Pat. No. 6,501,375, issued Dec. 31, 2002 to Bob R. Weant, et al, which is hereby incorporated by reference. However, the Weant system does not take into account numerous advances in sensor and system technology.

The present invention is aimed at one or more of the problems set forth above.

SUMMARY OF THE INVENTION

In one aspect of the present invention, a brake monitoring system is provided. The brake monitoring system includes a chassis communications module, one or more e-stroke sensors, one or more brake lining wear sensors, and at least one pressure sensor. The sensors are electronically coupled to the chassis communications module which reads and stores the sensor data. The chassis communications module utilizes the sensor data to detect brake stroke (dragging, non-functioning, overstroke), brake stroke sensor or lining wear faults. The sensor and fault data may be relayed to an off-board diagnostics tool for further analysis/diagnostics.

In one aspect of the present invention, real-time actual pressure sensor data is measured, transmitted, and optionally stored.

In another aspect of the present invention, the brake monitoring system includes a diagnostic display tool to detect over-stroke conditions.

In a still further aspect of the present invention, the chassis communications module and/or the diagnostic display tool may perform diagnostics as a function of the sensor data, including but not limited to, detecting the frequency and severity of panic stops, normal braking activity, etc. . . . .

In a first aspect of the present invention, a brake monitoring system for a vehicle having multiple axles and a plurality of brake actuators and an engine control module is provided. Each brake actuator is associated with one of the axles. The system includes a plurality of sensors, a plurality of brake lining wear sensors, a chassis communications module, and a diagnostic device. Each sensor is mounted in a respective actuator for sensing in real-time a parameter of the respective actuator and for generating a respective first signal. Each brake lining wear sensor is contained within each brake lining actuator and detects a brake wear parameter of the respective actuator and generating a respective second signal. The chassis communications module is coupled to the sensors and the brake lining wear sensors via a wire harness, receives the first and second signals and stores the first and second signals thereon. The chassis communications module detects a fault condition of one of the brakes as a function of the first and/or second signals and records the fault condition. The fault condition is one of a brake monitor warning and a brake lining warning. The chassis communications module has a plurality of warning lights. Each warning light corresponds to one of the fault conditions. The chassis communications module actuates a respective one of the warning lights in response to detecting the respective warning condition. The diagnostic device is coupled to the chassis communications control module via a datalink and receives the first and second signals and the fault conditions stored in the chassis communications control module and stores the first and second signals and the fault conditions on the diagnostic device. The fault condition may be indicative of a dragging brake condition. The chassis control module can then send a signal to the engine control module to throttle back the vehicle, or limit the speed of the vehicle and/or the RPM of the engine in response to detecting the dragging brake condition.

In a second aspect of the present invention, a method for monitoring the brakes of a vehicle having multiple axles, a plurality of brake actuators, and an engine control module is provided. Each brake actuator being is associated with one of the axles. The method includes the steps of sensing, in real-time, a parameter of each actuator, using a sensor, and for generating a respective first signal and detecting a brake wear parameter of each actuator using a brake lining wear sensor, and generating a respective second signal. Each brake lining wear sensor is contained within the respective brake lining actuator. The method further includes the steps of receiving the first and second signals at a chassis communications module via a wire harness and storing the first and second signals thereon, detecting a fault condition of one of the brakes as a function of the first and/or second signals and for recording the fault condition. The fault condition is one of a brake monitor warning and a brake lining warning. The method also includes the steps of providing, on the chassis communications module a plurality of warning lights, actuating a respective one of the warning lights in response to detecting the respective warning condition, receiving the first and second signals and the fault conditions at a diagnostic device coupled to the chassis communications control module via a datalink, and storing the first and second signals and the fault conditions thereon. The fault condition may be indicative of a dragging brake condition. The method also includes the step of sending a signal to the engine control module to throttle back the vehicle, or limit the speed of the vehicle and/or the RPM of the engine in response to detecting the dragging brake condition.

BRIEF DESCRIPTION OF THE DRAWINGS

Other advantages of the present invention will be readily appreciated as the same becomes better understood by reference to the following detailed description when considered in connection with the accompanying drawings wherein:

FIG. 9-16 are screenshots of the operation of the handheld tool of FIG. 8.

DETAILED DESCRIPTION OF INVENTION

Figure 1:
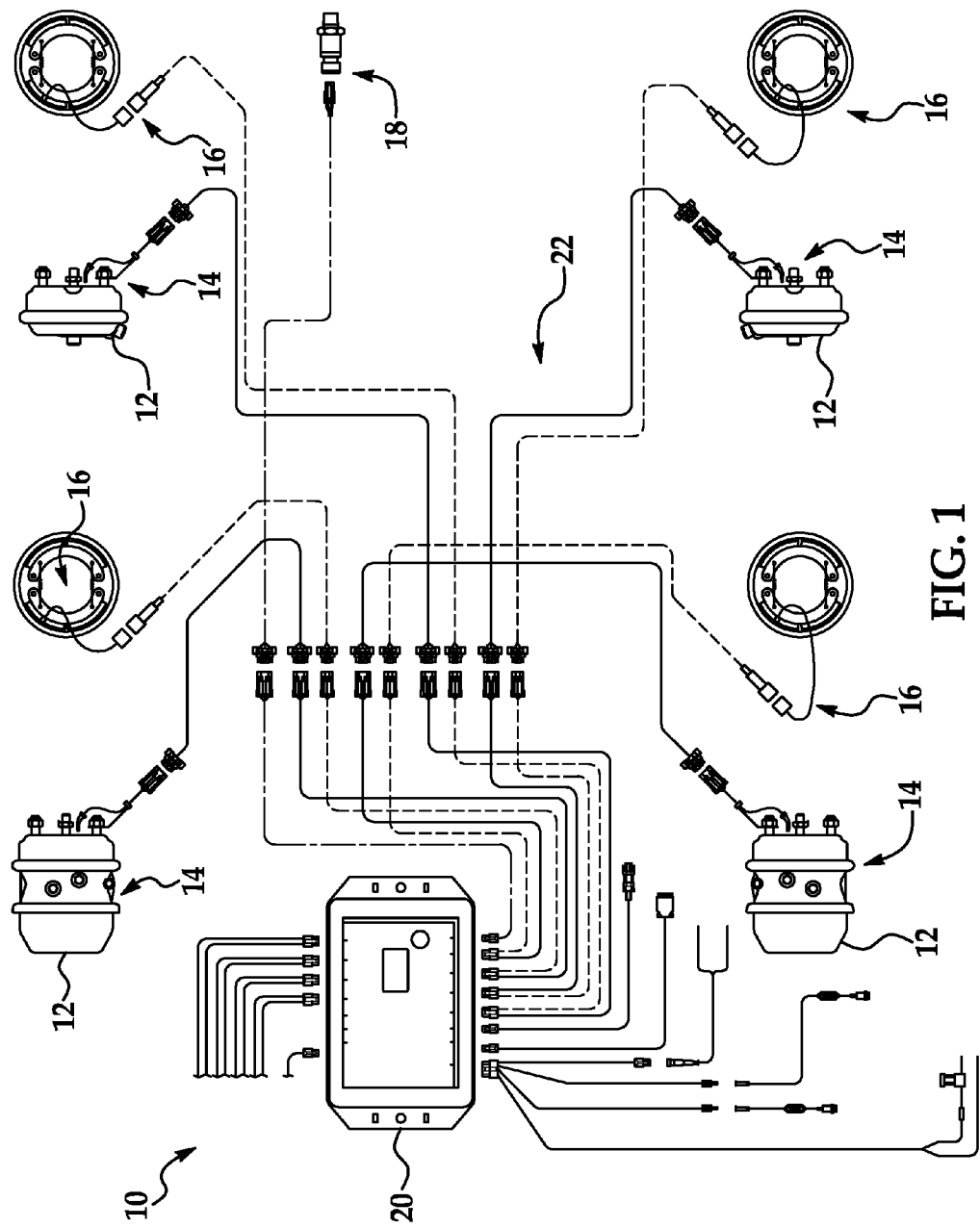
FIG. 1 is an illustration of a brake monitoring system, according to an embodiment of the present invention.
Figure 2A:
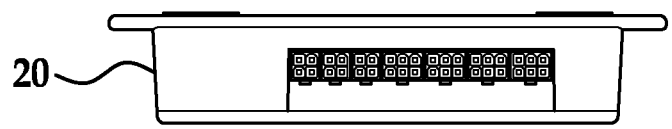
FIGS. 2A-2D are illustrations of a chassis communications module of the brake monitoring system of FIG. 1.
Figure 2B:
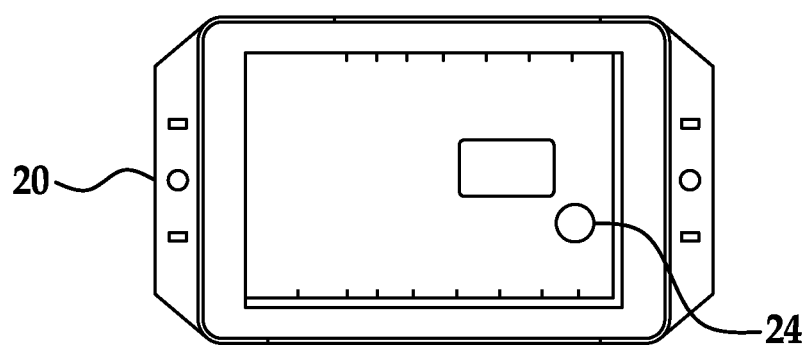
Figure 2C:
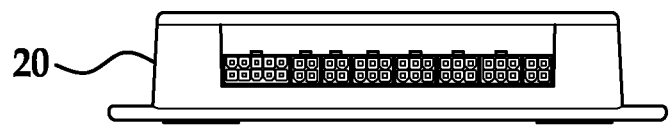
Figure 2D:
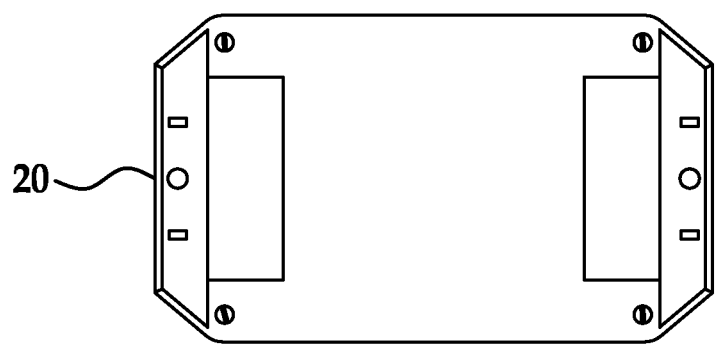

Referring to the Figures, wherein like numerals indicate like or corresponding parts throughout the several views, a brake monitoring system 10 for use with a motor vehicle (not shown) is shown. The motor vehicle includes a plurality of brake actuators 12 (in the illustrated embodiment, the motor vehicle includes 4 brake actuators 12). In the illustrated embodiment, the brake actuators 12 are drum brakes.

In general, the brake monitoring system 10 utilizes a plurality of sensors (see below) to continuously monitor the status of the brakes. One such system is disclosed in U.S. Pat. No. 6,411,206, which is hereby incorporated by reference. The brake monitoring system 10 includes an e-stroke sensor 14 mounted within each actuator 12 and a brake lining wear sensor 16. The e-stroke sensor 14 sensing a parameter of the actuator 12 which may be used in detecting over-stroke fault conditions. In one embodiment, the estroke sensor 18 provides real-time brake pressure application readings. Real-time brake pressure applications readings are transmitted via the J1939 network and can also be stored locally on the chassis communications module and may be downloaded off the vehicle and stored, e.g., on a diagnostics tool (see below). The brake lining wear sensor 16 is located within the brake lining of each set of brakes on the motor vehicle, and is described more fully below. An additional sensor may detect pushrod extension.

In an alternate embodiment, the brake actuators 12 are disc brakes. If disc brakes are utilized, the sensors 14 are used to measure brake application which then may be used to detect, inter alia, an over-stroke condition. In one aspect a position sensor may be used to sense the position of the lever arm or caliper of the disc brake actuator 12. An over-stroke condition may be detected by a reed-type switch sensors. Other types of position and/or location sensors may be used to monitor brake application or extension or pressure.

In one embodiment, the brake lining sensor 16 includes a wire embedded in a wearable material such as plastic, which is positioned within the brakes of the motor vehicle. As the material wears, the wire is exposed and a short-circuit condition is established. The short-circuit condition corresponds to a predetermined amount of brake lining wear, i.e., lining "low". After continued wear, the wire is broken and an open circuit condition is established. In one embodiment, the open circuit condition corresponds to a lining depleted condition.

The brake monitoring system 10 includes a chassis communications module 20. The sensors 14, 16, 18 are electronically coupled to the chassis communications module 20 through a wire harness 22. In one embodiment of the present invention, the chassis communications module 20 is located on the motor vehicle in a location accessible to a technician, and generally, not viewable in the cab of the motor vehicle.

In an alternate embodiment, the chassis communications module 20 is located within the cab. This would allow many of the functions of the communications module 20 to be performed in the cab by the driver.

The system 20:
    detects broken sensor wire/malfunctioning sensor at each wheel of the motor vehicle;
    detects non-functioning actuator;

detects brake pushrod extension fault using an algorithm based on brake pressure, pushrod extension and time;
provides overstroke fault detection;
logs, and may transmit off-board, real-time brake pressure readings;
provide fault detection based on brake pressure sensor readings; and
provide brake lining wear.

Brake pressure readings may be used to determine if the brakes are being applied, e.g., during a test procedure. Brake pressure information may also be used or displayed on a handheld tool (see below) for viewing by a technician during diagnostics. For example, the actual brake pressure may be used by the technician to determine if there is a brake overstroke problem. In a specific example, brake overstrokes are checked with 80-90 PSI applied to the brake system. If an overstroke occurs at 80-90 PSI or below it is valid. If it occurs over 90 PSI it is not valid. Typical vehicle brake systems can supply air pressure up to about 120 PSI maximum.

In one embodiment, the chassis communications module 20 provides an interface to a handheld diagnostics tool (see below) and/or an interface to a computer or laptop running a diagnostics program (see below). In the illustrated embodiment, the interfaces are providing through connectors which provide an SAE J1708 interface, a RS-232 interface, and an SAE J1939 interface, respectively, for the diagnostic tool and/or the computer/laptop.

The system 10 has a plurality of warning lights to convey specific information to an operator or a technician (see below).

With specific reference to FIGS. 1 and 2A-2D, the chassis communications module 20 includes a push button 22 which initiates a blink code sequence which is displayed through all system warning lights simultaneously.

In the illustrated embodiment, the system 10 has up to 4 warning lights available:
Warning Light 1: Tractor/Truck/Bus Brake Monitor Warning
Warning Light 2: Tractor/Truck/Bus Lining Warning
Warning Light 3: Trailer Brake Monitor Warning
Warning Light 4: Trailer Lining Warning The system 10 is designed to continuously monitor the motor vehicle's braking system while in operation. When a fault is occurring it is considered to be active and will turn ON the appropriate warning light. For example, if a tractor has an active dragging brake the Tractor/Truck/Bus Brake Monitor Warning Light will turn ON but the other lights will remain off. When the fault is no longer active or has been repaired the warning light will turn OFF.

The system 10 is capable of displaying both active and in-active (stored) fault information using a series of simple blink codes and the system warning lights.

In the illustrated embodiment, the chassis communications module includes a push button 24. Actuation of the push button 24, initiates the blink code sequence which is displayed through all of the system warning light(s) at once. All of the warning lights blink the same fault code simultaneously. Table 1 presents an exemplary blink code sequence.

In the exemplary blink code sequence, a first digit of "1" followed by a second digit of "1" means that there is not fault.

A first digit of a "3" through "6" means that there is some type of brake related fault. The second digit identifies the brake actuator 12 with the related fault. In the illustrated embodiment, the brake actuator is identified by axle and left or right side.

A first digit of "7" means that there is a system fault which is identified by the second digit.

TABLE 1

Exemplary Blink Code Sequence.

| First Digit | Second Digit | | |
|---|---|---|---|
| 1 | 1 | No fault | |
| 2 | 1 | Non-functional brake | (Axle 1 - left) |
| 3 | 2 | Over-stroke | (Axle 1 - right) |
| 4 | 3 | Dragging Brake | (Axle 2 - left) |
| 5 | 4 | E-stroke sensor fault | (Axle 2 - right) |
| 6 | 5 | Lining wear wearing | (Axle 3 - left) |
| | 6 | Lining wear wearing | (Axle 3 - right) |
| | 7 | Lining wear wearing | (Axle 4 - left) |
| | 8 | Lining wear wearing | (Axle 4 - right) |
| 7 | 1 | E-stroke system fault | Pressure transducer |
| | 2 | Lining wear wearing | SAE J1708/J1939 Comm. |
| 10 | | Fault codes cleared | |

Figure 3:
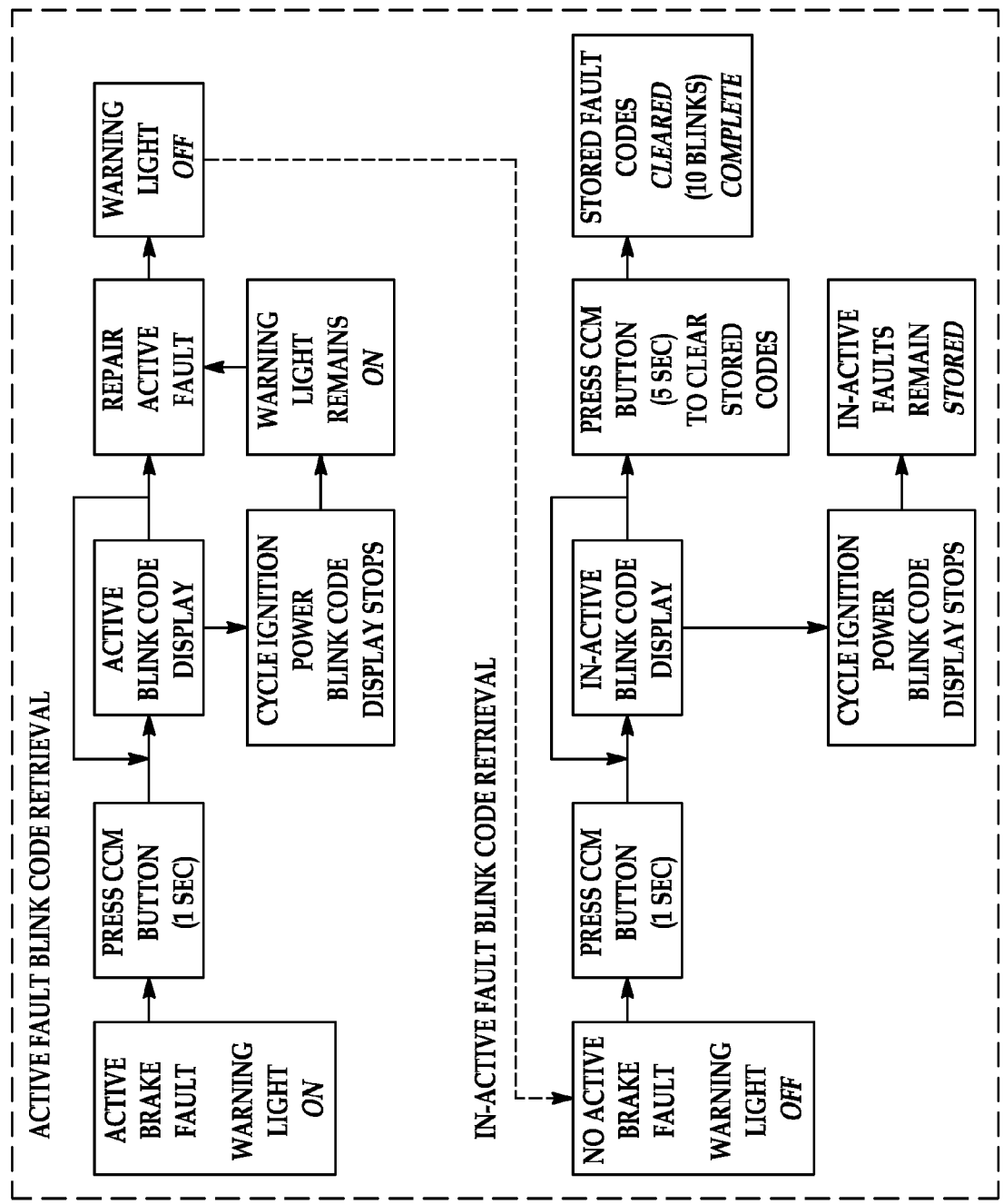
FIG. 3 is a flow diagram of the blink code operation of the chassis communications module of FIGS. 2A-2D.

With particular reference to FIG. 3, an exemplary blink code fault retrieving process is illustrated. The system 10 will display blink codes for only active faults only when an active fault is occurring. The warning lamp will be ON when the system 10 is operating and an active fault is occurring. The active fault will need to be repaired and the warning light will need to be OFF before in-active stored faults can be retrieved with this blink code method. If the blink code sequence is initiated when the warning light is OFF then stored fault codes will be displayed.

The Blink Code Display Sequence is as follows:
1. To retrieve the active or in-active stored fault codes, press the push button 24 on the front of the chassis communications module 20 for 1 second and release. This will start the blink code sequence.
2. Watch the warning light(s) and count the blink codes.
3. The Blink Codes will be displayed in a loop until the ignition power is shut off or the fault codes are cleared.
4. To clear the fault codes press and hold the push button 24 on the front of the chassis communications module 20 for a minimum of 5 seconds and release. The warning light will blink 10 times acknowledging that the stored fault codes have been cleared.

The Blink Code Sequence will use the following timing:

| Blink Code Timing: | |
|---|---|
| 0.5 seconds | Lamp On |
| 0.1 seconds | Lamp Off |
| 1.5 seconds | Pause In-Between Digits |
| 4 seconds | Pause In-Between Faults |

Notes:
1. It is a good idea to have a pencil and paper ready to write down the blink codes as they are displayed.
2. Pressing the CCM push button for 5 seconds will only clear stored fault codes and will not repair an issue with the foundation braking system which is causing the fault.
3. With an active e-stroke fault (warning light ON) the e-Stroke system will broadcast the applicable SAE J1708 and/or J1939 code.

Example Blink Code Definition:
Brake System Fault: Axle 2 Right—Dragging Brake
Blink Code: 4-4
Brake System Fault: SAE J708/J1939 Communications
Blink Code: 7-2
Brake System Fault: None
Blink Code: 1-1

While the above described a blink code sequence utilizing 4 lights, it should be noted that other designs are possible within the scope of the present invention. For example, the communications module 20 could utilize a display capable of displaying text messages communicating the fault messages.

As discussed above, the controller 10 provides an interface for connection to a diagnostic tool 30 which may be embodied in a hand held tool, a computer or laptop 30 for downloading of stored sensor data and the performance of diagnostics and testing. In one embodiment, the diagnostic tool 30 may be used to run a diagnostic program to acquire the following information from the chassis communications module 20.

Current Wheel Specific Brake & Lining Status
Stored Fault History
System Status
CCM Information: Software Version, Configuration, Serial Number.

In one embodiment, the diagnostics tool 30 is provided at a location where service may be performed and is generally not permanently located on the vehicle. In an alternate embodiment, the diagnostics tool 30 is an on-board tool which may be either connected to the system 10 in the cab or may be permanently mounted within the cab and may be connected to the communications module 20.

In one embodiment, a RS-232 Diagnostic Program Kit may be provided. The kit may include: a Diagnostic Program Software CD, a 10 ft RS-232 Diagnostic/Programming Harness, and a USB High Speed Serial Adapter Harness.

Figure 4:
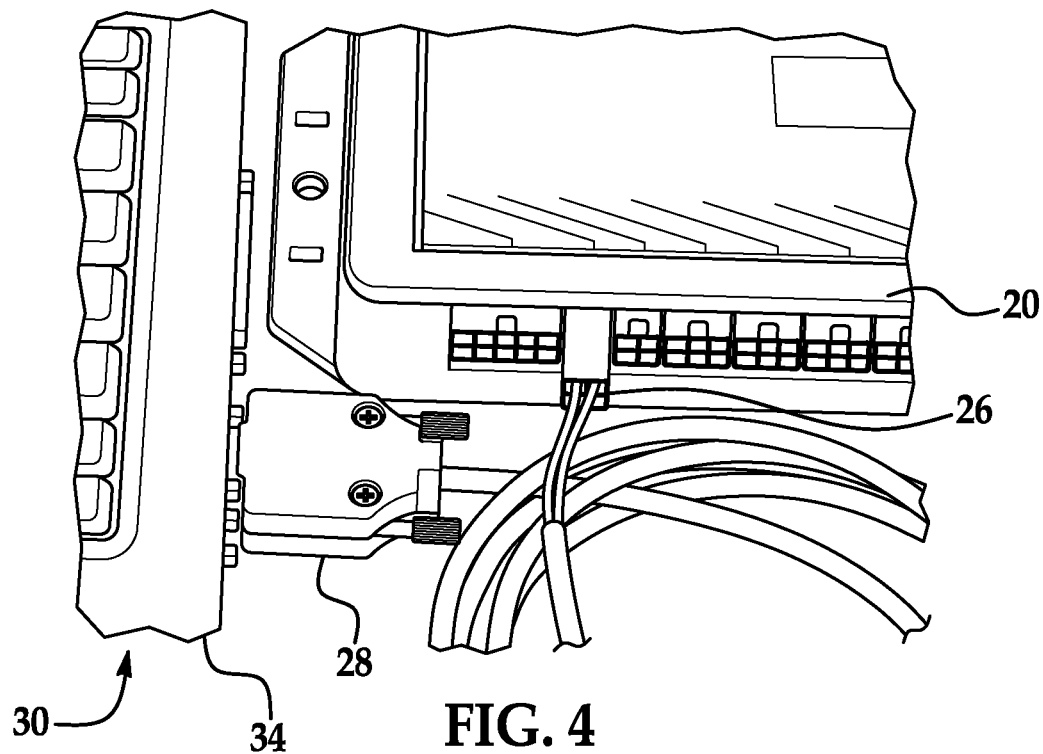
FIG. 4 is a diagrammatic illustration of a harness connection between the chassis communications module of FIGS. 2A-2D and a laptop computer.

Set-Up Instructions:

1. The supplied Diagnostic Harness P/N 8290220 connects the diagnostic tool 30 to the chassis communications module 20. Plug the White 4-Pin connector into to the chassis communications module 20 P2 connector as shown in FIG. 4.

2. Connect the DB9 connector into the tool's serial COM port. If a serial COM port is not available on the computer then the USB High Speed Serial Adapter Harness must be used. Simply plug the DB9 connectors together, and then plug the adapter harness USB connector into a USB receptacle on the computer.

Figure 5:
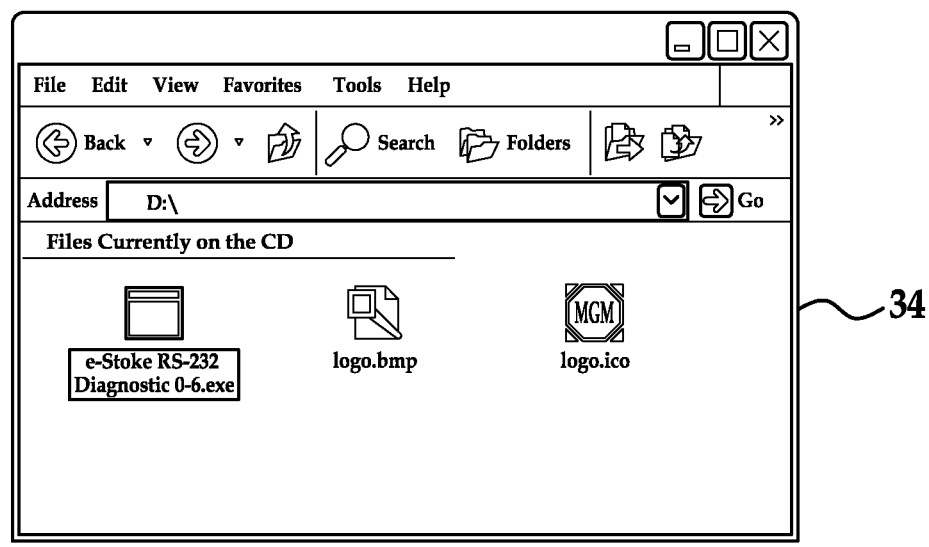
FIGS. 5-7 are screenshots of a diagnostics program running on the laptop of FIG. 4.

3. The RS-232 Diagnostic Program can be run directly from the supplied CD. Place the RS-232 Diagnostic Program CD into the appropriate drive on the computer. Access the contents of the CD through the CD Drive Window. Start the RS-232 Diagnostic program by double (left) clicking on the e-STROKE RS-232 DIAGNOSTIC.exe file as shown below in FIG. 5.

Figure 6:
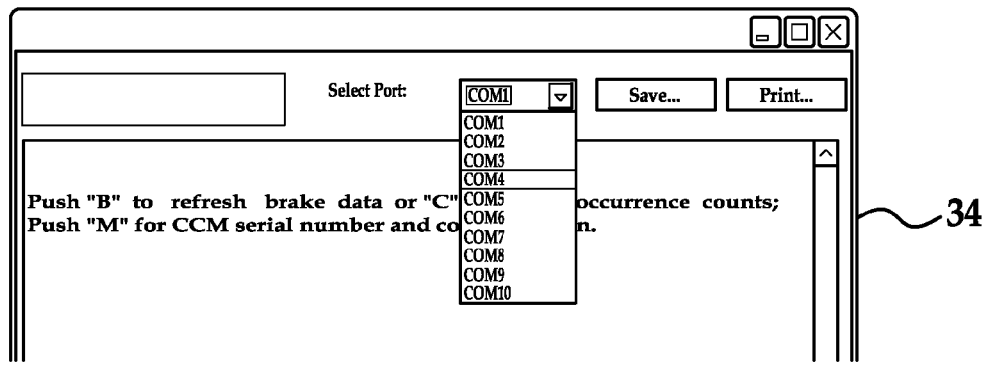

4. Once the RS-232 Program window is open the appropriate COM port must be selected. See FIG. 6. Typically the DB9 connector will operate as COM 1 where equipped. The USB High Speed Serial Adapter will be assigned a COM port number when connected. The COM port assigned to the USB Adapter Harness can be looked up in the Device Manager. See Step 5.

5. To locate the Computers Device Manager Follow these Steps. Note: This instruction applies to Windows applications.
Select the Start Button, Settings, and then Control Panel.
Once the Control Panel Window is open select the System Icon.
Once the System Properties Window is open select the Hardware Tab and then the Device Manager Button.
With the Device Manager open, locate the Ports (COM & LPT) item.
Left Click the Cross next to "Ports (COM & LPT)".
All of the active COM ports will now be displayed with number assignments.
Find the COM port which lists the USB Adapter and note the COM number.

6. After selecting the appropriate COM port number you must then select the main display field. Click your mouse anywhere in the display window. This will allow you to continue interfacing with the Diagnostic program rather than the COM port setting.

7. The e-Stroke RS-232 Diagnostic Program is now ready to acquire data from the system 10.

Figure 7:
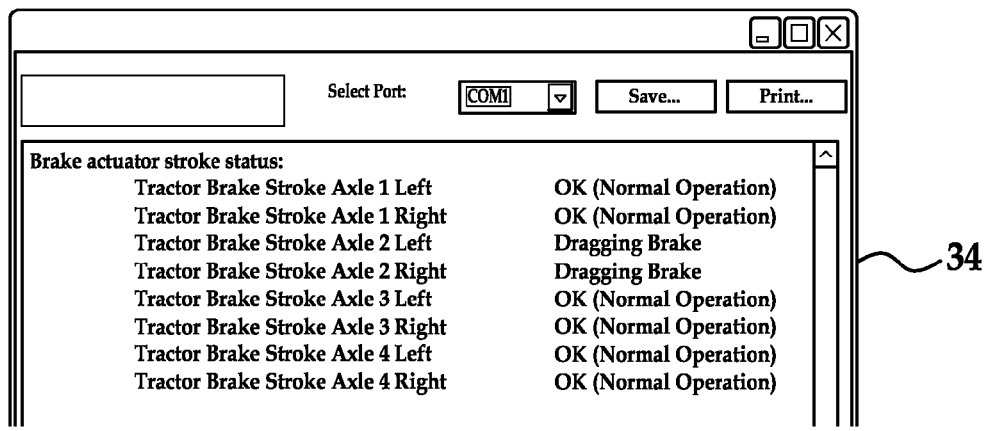
Figure 8:
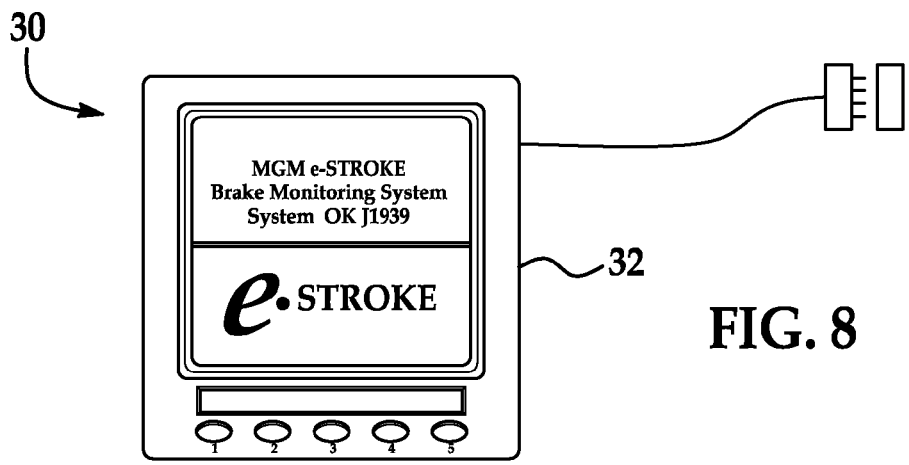
FIG. 8 is a diagrammatic illustration of a handheld tool for use with the chassis communications module of FIGS. 2A-2D.

Diagnostic Program Operating Instructions:

The RS-232 Diagnostic Program has 2 different display windows which provide the following e-Stroke Brake & System information (See FIGS. 6 and 7):

CCM Data Window Information:
CCM Serial Number
Software Version Number
Axles with Brake Stroke Sensors
Axles with Lining Wear Sensors (Drum/Disc)
CCM Type
J1708 Status
J1939 Status
Brake Data Window:
Wheel specific data is displayed and refreshed using the B command. (See FIG. 5 Below)
Brake Actuator Stroke Status—Displays Current Active Status with B command.
Brake Stroke Fault Occurrence Counts—Displays Non-Current Stored Fault Counts.
Brake Lining Status—Displays Current Active Status with B command.
Brake Application Pressure—Displays Current Application Pressure with B command.
Pressure Transducer Fault Occurrence Count—Displays Non-Current Stored Fault Count
CCM Serial Number
Software Version Number
Axles with Brake Stroke Sensors
Axles with Lining Wear Sensors (Drum/Disc)
CCM Type The RS-232 Diagnostic Program can be operated using the following keys:
B—Pressing B will acquire brake data that is current/active in the CCM when the button is pressed.
C—Pressing C will clear the stored fault codes from the CCM.
M—Pressing M will display the CCM information.

8. Press one of the Function Keys and the RS-232 Diagnostic Program will automatically acquire the desired data from the chassis communications module. Pressing B additional times will acquire updated brake data. Note that each time B is Pressed the brake data is refreshed and replaces the previously displayed data. The displayed data must be saved if a record is required. Use the slider on the right of the window to navigate the report.

9. The displayed brake data or CCM information can be saved by Pressing the Save button. A Save Window will open prompting for a file name and save location. Enter the information as desired and press Save. The RS-232 Diagnostic Program will then save a Text (.txt) file. See FIG. 7.

If a .txt format is not desired then the displayed data can be copied and pasted into the desired program.

10. The displayed brake data can also be printed by Pressing the Print button. This program will print to the default printer which is set on the computer that is being used.

Saved and Printed Brake Data will include a Date and Time Stamp at the beginning of the report.

With particular reference to FIGS. 8-16, the system 10 may also include a handheld diagnostic tool 30. The brake monitoring system 10 continuously monitors the brake status of the motor vehicle. As brake faults occur, the system 10 sends SAE J1708/J1939 fault codes over the vehicle's J1708 or Controller Area Network (CAN) where applicable.

The handheld tool 30 monitors the vehicles J1708 or J1939 CAN network for the system status and brake fault codes. All system brake faults are published SAE J1708/J1939 codes (See Engineering Bulletin EB 08-025 e-Stroke SAE Fault Codes rev. 01.xls)

The handheld tool 10 can be easily used with the supplied diagnostic harness which can connect to either a 6 or 9-pin diagnostic port (OBD) connector. When connected to the vehicle's diagnostic port connector the handheld tool 30 will automatically turn on and establish communication with the chassis communications module 20.

The handheld tool 30 displays real time system status, lining wear (if applicable) and active brake faults. In addition the brake fault history can be acquired from the system. Vehicle speed and brake application pressure are also available for diagnostic purposes.

In one embodiment, the handheld tool 30 may be supplied in a toolkit. The toolkit may consist of the following components: the handheld tool 30 and a display diagnostic harness. The diagnostic harness is capable of connecting the handheld tool 30 to the vehicle's OBD port. Standard 6 and 9 pin connector plug leads are included on the harness to connect the display to the vehicles OBD circuit. Vehicles with 6 Pin OBD port connectors typically only include SAE J1708. Vehicles with 9 Pin OBD port connectors typically include both SAE J1708 and J1939.

To utilize the handheld tool 30, connect the diagnostic harness 12 pin connector labeled "Display" into the receptacle on the back of the tool 30. Next connect either the 6 or 9-pin diagnostic connector into the available OBD port on the vehicle. The tool 30 will receive vehicle power and automatically turn ON and search for the system 10 on either the SAE J1939 or J1708 circuit. The tool's display will indicate which communications protocol (J1708 or J1939) is being used. The tool 30 is now connected and ready for use.

Additional Display Connection Option:

In the illustrated embodiment, the system's 10 fault history and brake application pressure is only available on the J1939 circuit. J1708 is only capable of displaying the system faults in real time as they occur. If a system 10 is installed on a vehicle and connected to the J1708 circuit, a direct J1939 connection can be made to the chassis communications module 20 to acquire fault history and brake application pressure.

To access vehicle power, connect either the 6 or 9 pin diagnostic connector into the available OBD port on the vehicle. Next connect the 4-Pin connector labeled "P3" into the P3 connector on the chassis communications module 20. The tool's display will now have power and a direct connection to the J1939 connection on the chassis communications module 20.

When the tool 30 is plugged in it will show a splash screen while the tool 30 conducts a self test. When the self test is complete a home screen will be displayed. The home screen displays system status as well as the active diagnostic circuit being used (see FIG. 8).

The tool 30 can be navigated using the 5 soft keys (labeled "1", "2", "3", "4", and "5") on the front of the display. A Button Bar graphic (see, for example, FIG. 9) will appear after a soft key is pressed indicating the menu options available. With the button bar displayed the appropriate soft key below the icon can then be pressed selecting the option that is desired. The Button actions will vary depending on the options displayed on the Button Bar (see FIGS. 8, 9, and 13).

The tool 30 requires connection to either the vehicle's SAE J1708 or J1939 circuit to retrieve data from the system 10. If communication over one of these circuits is not present then the icon shown in FIG. 10 will appear. When communication is restored the icon will disappear and the active CAN circuit will be displayed on the home screen (FIG. 11).

With reference to FIG. 1, a vehicle speed and brake application pressure diagnostic page displays real time vehicle speed and brake application pressure. This data can be used to aid in the diagnosis of a reported brake fault.

With reference to FIG. 12, a system fault is considered active while the fault is occurring. Active faults are displayed using flashing pop up alarm windows on the tool's display. The alarm window appears overlaid on the current screen in use, showing details of the fault which is occurring.

Pressing any key will acknowledge the fault and display the active alarm (fault) page. This page shows the list of active faults occurring with the system 10. The button bar icons 34 show the navigation and function options available on the page (See FIG. 13).

Key Functions:

The Arrow keys 1 & 2 can be used to scroll through the active faults. An Active Alarm can be acknowledged by pressing key 3. The Inactive Stored Fault Table can be accessed by pressing key 4 for 5 seconds.

Figure 14:
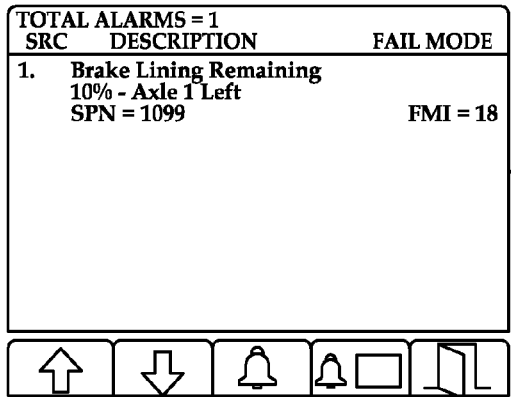
Figure 15:
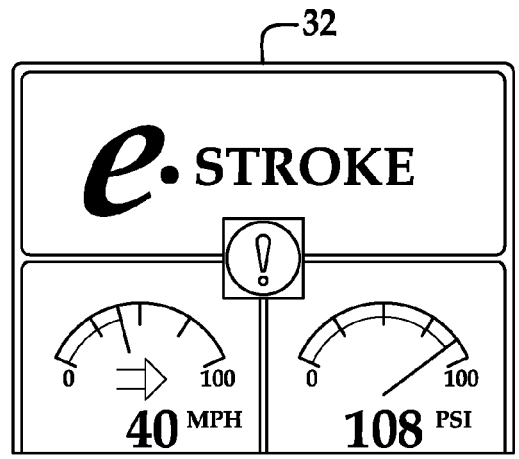

The active alarms must be acknowledged by pressing key 3 before this page can be exited (see FIG. 14).

Key Functions:

The Inactive Stored Fault Table can be exited by pressing key 5.

If the Active Fault Table Page is exited while there is still an active alarm present a caution icon will appear indicating that an active alarm is still present. The active fault must be repaired before the caution icon will go away (See FIG. 15).

Faults which occur during operation of the system 10 will be stored in the chassis communications module's memory, up to 126 counts per fault per wheel. The fault count will increment once per fault occurrence regardless of the duration of the active fault.

The stored fault alarms can be accessed from the chassis communications module's memory by accessing the Active & Inactive Fault Table. The fault table can be accessed from the home page by pressing the Active & Inactive Fault Table key. The Active fault table will then be displayed. The Active & Inactive Fault Table key must then be pressed again for 5 seconds to display the stored faults from the chassis communications module's memory (see FIG. 9).

Figure 16:
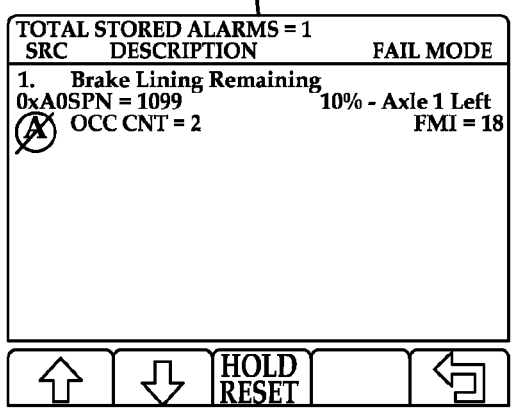

Inactive faults are marked with an inactive icon (See FIG. 16).

Key Functions:

The Arrow keys 1 & 2 can be used to scroll through the inactive faults.

Press the "HOLD RESET" Key 3 for 5 seconds to clear the chassis communications module fault history.

The Inactive Stored Fault Table exited by pressing the return key 5. This will return to the Inactive fault table where the key 5 can then be pressed to exit to the home screen. Note: Stored Inactive faults can only be accessed from the chassis communications module through the J1939 circuit. J1708 does not support the chassis communications module fault history retrieval or brake application pressure.

The contrast and back light of the tool's display screen can be adjusted. Access the contrast adjustment screen by pressing the Contrast & Back Light Adjustment key from the home page. Follow the button bar icons to adjust as required.

The display configuration menus can be accessed from the home page. With the Button Bar 34 not visible on the screen, press key 5 for 5 seconds to display the Configuration Menu. Select Settings or System to continue.

Key Functions:

The Arrow keys 1 & 2 can be used to scroll through the configuration options.

Arrow key 4 will select the option indicated by the arrow.

Key 5 will exit the Configuration Menu Page returning to the home page.

The following display settings can be adjusted to meet the application requirements:

Display Settings Menu:

Units—Units can be adjusted between English and Metric.

Language—The Language displayed can be changed.

Bleep—The audible key bleep can be turned on or off.

Backlight—Backlight mode and level can be adjusted.

System Menu:

Demo—Three Demo options are available to illustrate the features of the display. Select 0 to shut the Demo option OFF.

Restore Defaults—This will reset the display back to factory settings.

COM Viewer—Displays real time data traffic on the J1708 & J1939 circuits.

Data link Settings—Allows Adjustment of J1939 & J1587 Data Link Settings.

About—Displays Display unit information.

Key Functions:

The Arrow keys 1 & 2 can be used to scroll through the display options.

Arrow key 4 will select the option indicated by the arrow.

Key 5 will return to the previous page.

Diagnostics and Limp-Home Features

The system can record and store all brake pressure readings and fault conditions. These may be downloaded to an off-site or off-vehicle device for storage and diagnostic purposes. The data stored in the system 10 may be transmitted in real-time through a wireless connection or transmitted in batch mode. The data may also be stored redundantly in a black-box type of device.

The data, e.g., application of the brake measure via brake extension or brake pressure, may be used during accident investigations.

Additionally, the data may be used in real-time to prevent unsafe operation of the vehicle. For example, if the brake system experiences a fault, generally the vehicle may still be operated. However, if the brake condition renders the vehicle unsafe to operate, the system 10 may be the ability to safely affect or limit the vehicle's operation. For example, if one of the brakes is experiencing a dragging brake condition the system 10, a potential fire condition may exist on the respective tire. If this occurs, the system 10 may send a signal to an engine control module to throttle back the vehicle, or limit the speed of the vehicle and/or the RPM of the engine.

Obviously, many modifications and variations of the present invention are possible in light of the above teachings.

We claim:

1. A brake monitoring system for a vehicle having an engine control module, comprising:
   a brake actuator for actuating a brake pad; an actuator sensor for monitoring a stroke of the brake actuator and generating a stroke signal indicative of a condition of the brake actuator;
   a brake pad wear sensor for detecting pad wear of a brake pad and generating a wear signal indicative of a condition of the pad wear;
   a controller interactive with said actuator sensor for receiving the stroke signal and said brake pad wear sensor for receiving the wear signal, said controller evaluating the stroke signal and the wear signal and determining a fault condition, the fault condition being one of a plurality of fault conditions associated with the stroke signal and the wear signal, and generating a warning signal corresponding to the fault condition; and
   said controller distinguishing whether the fault condition is a fault condition that renders the motor vehicle unsafe to operate, the fault condition being one of the plurality of fault conditions associated with the stroke signal which comprise a dragging brake fault condition, a non-functioning brake fault condition and an overstroke fault condition, and signaling the engine control module to adjust engine speed in response to the fault condition corresponding to the fault condition that renders the motor vehicle unsafe to operate.

2. The brake monitoring system set forth in claim 1, further including a pneumatic pressure sensor for monitoring pneumatic pressure applied to the brake actuator and generating a pneumatic pressure signal with said controller being interactive with said pneumatic pressure sensor for receiving the pneumatic pressure signal.

3. The brake monitoring system set forth in claim 2, wherein said brake actuator is configured to actuate a disk brake and said actuator sensor includes monitoring a location of a lever arm of a brake caliper.

4. The brake monitoring system set forth in claim 1, wherein said controller includes a plurality of warning lights, each of said plurality of warning lights corresponding to each of the plurality of fault conditions associated with the stroke signal and the wear signal.

5. The brake monitoring system set forth in claim 1, wherein said controller communicates with a diagnostic device via a datalink.

6. The brake monitoring system set forth in claim 5, wherein said datalink is a wireless datalink.

7. The brake monitoring system set forth in claim 5, wherein said datalink is a wired datalink.

8. The brake monitoring system set forth in claim 5, wherein said diagnostic device is portable.

9. The brake monitoring system set forth in claim 1, wherein the fault condition that renders the motor vehicle unsafe to operate corresponds to the dragging brake fault condition.

10. A method of monitoring a brake system of motor vehicle having brake actuators for actuating brake pads, comprising the steps of:
    monitoring individual movement of each brake actuator and generating an actuator signal indicative of a condition of each brake actuator;
    monitoring wear of each brake pad and generating a wear signal indicative of a condition of each brake pad;
    monitoring pneumatic pressure applied to each brake actuator and generating a pneumatic pressure signal indicative of a pneumatic pressure applied to of each brake actuator;
    determining a fault condition by evaluating the actuator signal, the wear signal, and the pneumatic pressure signal, the fault condition being one of a plurality of fault conditions associated with the actuator signal, the wear signal and the pneumatic pressure signal; and
    distinguishing whether the fault condition is a fault condition that renders the motor vehicle unsafe to operate, the fault condition being one of the plurality of fault conditions associated with the actuator signal which comprise a dragging brake fault condition, a non-functioning brake fault condition and an overstroke fault condition, and generating an engine control signal in response to the fault condition corresponding to the fault condition that renders the motor vehicle unsafe to operate and modifying engine speed of the motor vehicle by transmitting the engine control signal to an engine control module of the motor vehicle.

11. The method set forth in claim 10, wherein the fault condition that renders the motor vehicle unsafe to operate corresponds to the dragging brake fault condition.

12. The method set forth in claim 10, wherein said step of monitoring individual movement of each brake actuator is further defined by monitoring movement of a pushrod on a drum brake actuator.

13. The method set forth in claim 10, wherein said step of monitoring individual movement of each brake actuator is further defined by monitoring location of a lever arm on a caliper of a disc brake.

14. The method set forth in claim 10, further including the step of generating a display signal in response to determining the fault condition by evaluating the actuator signal, the wear signal, and the pneumatic pressure signal.

15. The method set forth in claim 10, further including the step of transmitting a display signal indicative of the fault condition determined by evaluating the actuator signal, the wear signal, and the pneumatic pressure signal to a remote display.

16. The method set forth in claim 15, wherein the display signal is a wireless display signal.

17. The method set forth in claim 10, wherein said step of monitoring individual movement of each brake actuator includes detecting an overstroke, a dragging brake, and a non-functioning brake.

18. The method set forth in claim 10, wherein said step of monitoring the wear of each brake pad is further defined by monitoring a status of a wire disposed in said each brake pad.

19. The method set forth in claim 10, wherein said step of monitoring pneumatic pressure applied to each brake actuator is further defined by monitoring pneumatic pressure required to actuate each brake actuator.

* * * * *